Patented Nov. 27, 1923.

1,475,446

UNITED STATES PATENT OFFICE.

ISIDOR POLLAK AND ERICH MÖHRING, OF VIENNA, AUSTRIA.

PROCESS FOR THE MANUFACTURE OF ARTIFICIAL RESINS FROM PHENOL AND FORMALDEHYDE.

No Drawing. Application filed April 20, 1922. Serial No. 555,699.

*To all whom it may concern:*

Be it known that we, ISIDOR POLLAK and ERICH MÖHRING, citizens of the Republic of Austria, residing at Vienna, in the Republic of Austria, have invented certain new and useful Improvements in the Process for the Manufacture of Artificial Resins from Phenol and Formaldehyde, of which the following is a specification.

This invention relates to a process for the manufacture of infusible resins from phenol and formaldehyde in which more than one molecule of formaldehyde is caused to react with one molecule of phenol in the presence of a weak organic acid, and which is characterized in this that such a quantity of a volatile base is added to the mixture after separation of the resin that the point of neutralization is slightly exceeded.

More particularly mono- or poly-basic carboxyl acids are used as organic acids, and more particularly dimethylamine is used as a volatile base. Resins are obtained by this process which have a hardness and tensile strength which have not yet been obtained, which are absolutely unaffected by light and have a transparency and purity which makes them comparable to the finest kinds of amber; more particularly it is remarkable that if the amount of formaldehyde is increased up to about three molecules for one molecule of phenol, a product is obtained which has the electric properties of amber so that it is comparable to the latter also in that respect. The special qualities of the product are attributed to the circumstance that it has been succeeded by means of the present process to increase the amount of formaldehyde and at the same time to do away with the drawbacks which are met with when only molecular ratios are used.

Attempts to increase the amount of formaldehyde have already been made as well for alkaline as for acid artificial resins; they have, however, given unfavourable results for both kinds of resins.

If more than one molecule of formaldehyde is used with alkaline condensation, according to prior methods, a fissured product is obtained which has the appearance of a compressed, crystalline mass traversed by light-refracting surfaces and which is extremely friable, brittle and quite opaque.

If in the manufacture of acid, infusible resins, by methods heretofore proposed, more than one molecule of formaldehyde is used for one molecule of phenol, a cloudy, fissured product is obtained which smells strongly of formaldehyde and is discoloured and rendered opaque after a few hours only.

The excellent results of the present process are the more surprising in view of the fact that the previous publications either in the patent or the scientific literature did not foresee that it would be possible to manufacture a serviceable resin which would contain more than one molecule of formaldehyde for one molecule of phenol and in addition would have the advantages of a greater transparency and hardness together with the good properties of the alkaline resins having one molecule of formaldehyde.

The new resin is considerably different in its physical properties from the products hitherto known. It has a much higher specific gravity (1.287) whilst the formerly produced alkaline resins have a specific gravity of 1.26 and the acid resins a specific gravity of 1.27 only.

The new resin takes by polishing a highly polished surface which can only be compared with that of a metal. The resins obtained according to the three examples, given below become electrified when rubbed with a cloth, which property could be obtained for the resins hitherto manufactured only after a continuous, long heating of the finished product and only temporarily.

A few modes of carrying the process into effect are given hereinafter;—

According to the desired hardness of the finished product, a molecule of phenol or of one of its homologues is mixed with 1, 2 or 3 molecules of formaldehyde and a small quantity of organic acid is added acting as a condensation means, the best acids being mono- or poly-basic carboxyl acids, (although others can be used) the amount of acid used being such, that the separation of the resin takes place after 8 to 12 hours boiling. As soon as the mixture begins to become cloudy, a volatile organic base is added; also some ammonia may be used. The amount of the said base should be such that the point of neutralization is only slightly passed.

The boiling is continued for another 2 to 5 minutes, cooling is allowed to take place, washing is effected several times with distilled water, the moist reaction mixture is subjected to distillation in vacuo which is continued until the mass becomes entirely clear, a small quantity of volatile base is again added, and a further distillation in vacuo is effected until only a very small quantity of liquid passes over. The resin which has been so treated is now hardened at a temperature of 70 to 110° C. with or without pressure. In the appended claims, "a simple phenol" is intended to embrace phenol, $C_6H_5OH$, as well as its homologues. Also the expression "oxy-acid" and like expressions, are intended to embrace both "mono-oxy" and "poly-oxy" compounds. The term "methylamine" includes mono-, di- and tri-methylamine. It is to be understood also that many other volatile bases can be substituted for these.

*First example.*

100 grams of phenol, 100 grams of formaldehyde (40 volumes per cent), 1.9 grams of salicylic acid (this amount may be varied more or less.)

These quantities are boiled in a vessel having a reflux-cooler until the mixture becomes creamy, which occurs in ten to twelve hours.

6.5 c.c. of dimethyl amine solution containing 153 grams of dimethylamine per litre are added, the boiling is continued for another three to five minutes, the resin is washed several times with distilled water and is distilled in vacuo after which to each 100 grams of resin at 75° C. up to 7 c.c. of a 1% ammoniacal solution are added.

The resin is then distilled over until small traces only of fluid pass over.

The resin is now hardened at a temperature of 75 to 110° C. with or without pressure. The specific gravity of the hardened resin is 1.274.

*Second example.*

100 grams of phenol, 100 grams of formaldehyde (40 volumes %), 2.5 grams of salicylic acid.

The reaction and its further treatment takes place as described in the first example. However, instead of 6.5 c.c. of dimethyl amine solution, 8 c.c. of the solution of the same concentration are added. The specific gravity of the resin in a hardened state is 1.282.

*Third example.*

100 grams of phenol, 240 grams of formaldehyde (40 volumes %), 3.2 grams of salicylic acid, are condensed as above. The reaction and its susequent treatment are carried out as in example 1; however, instead of 6.5 c.c. of dimethyl amine solution, as in the first example 11 c.c. of this material, of the strength above stated, are added. The specific gravity of the product obtained is 1.287.

We claim:

1. Process for the manufacture of coloured, transparent, artificial resins from phenol and formaldehyde, in which to one molecule of a simple phenol, more than one molecule of formaldehyde is added and caused to react in the presence of a weak organic acid, characterized by adding to the mixture after separation of the resin so much of a volatile base, that the point of neutralization of said mixture is slightly passed.

2. A process as claimed in claim 1, characterized in this that an oxy-carbonic acid is used as an organic acid.

3. A process as claimed in claim 1 characterized in this that a methylamine is used as a volatile base.

4. A process as claimed in claim 1, characterized in this that more than two molecules of formaldehyde are caused to react upon one molecule of phenol.

5. A process as claimed in claim 1, characterized in this that a small quantity of a volatile base is again added to the still fluid resin during the distillation.

6. A clear transparent resin containing the reaction product of one molecule of a simple phenol, with more than one molecule of formaldehyde, such resin having a specific gravity of about 1.274 to 1.287, such product permanently having the property of becoming electrified by friction, and being capable of taking a high polish.

In testimony whereof we affix our signatures.

Ing. ISIDOR POLLAK.
ERICH MÖHRING.

Witnesses:
 CARL CONDENHORY,
 FRIEDRICH RINDE.